United States Patent [19]

Ackeret

[11] Patent Number: 4,798,015
[45] Date of Patent: Jan. 17, 1989

[54] CONTAINER FOR A PILE OF PICTURES

[75] Inventor: Peter Ackeret, Kusnacht, Switzerland

[73] Assignee: Licinvest AG, Chur, Switzerland

[21] Appl. No.: 59,874

[22] PCT Filed: Oct. 29, 1986

[86] PCT No.: PCT/EP86/00622
§ 371 Date: Jun. 11, 1987
§ 102(e) Date: Jun. 11, 1987

[87] PCT Pub. No.: WO87/03105
PCT Pub. Date: May 21, 1987

[30] Foreign Application Priority Data

Nov. 6, 1985 [DE] Fed. Rep. of Germany ....... 3539339

[51] Int. Cl.[4] ................................. G09F 1/12
[52] U.S. Cl. ..................... 40/152.1; 40/513; 248/455
[58] Field of Search ................. 40/513, 490, 511, 508, 40/509, 152, 152.1, 156; 248/455, 463, 464, 465

[56] References Cited

U.S. PATENT DOCUMENTS

| 2,245,363 | 6/1941 | Price | 40/152.1 |
| 4,310,091 | 1/1982 | Hara et al. | 40/152.1 |
| 4,376,348 | 3/1983 | Ackeret | 40/513 |
| 4,577,822 | 3/1986 | Wilkerson | 248/455 |
| 4,674,209 | 6/1987 | Ackeret | 40/513 |

FOREIGN PATENT DOCUMENTS

| 3014394 | 10/1981 | Fed. Rep. of Germany. | |
| 2440718 | 7/1980 | France | 40/152.1 |
| 2503390 | 4/1981 | France. | |
| 86/03021 | 5/1986 | World Int. Prop. O. . | |

Primary Examiner—Ira S. Lazarus
Assistant Examiner—D. M. Cox
Attorney, Agent, or Firm—Robert R. Jackson

[57] ABSTRACT

The invention relates to a container for a pile of substantially rectangular pictures of like format having a housing with a viewing window and a slider member that can be pulled out of the housing and a stand hinged to the base of the housing opposite the window, which stand has stop members which, when the stand is folded out, arrest the stand by coming up against complementary stop members on the housing, the stop members and complementary stop members being arranged at a distance from the stand hinge in the direction towards the free end of the stand and the elements having the stop faces being designed and arranged in such a manner that they move apart with resilient deformation as the stand is folded out and overlap one another when the stand is folded away.

18 Claims, 5 Drawing Sheets

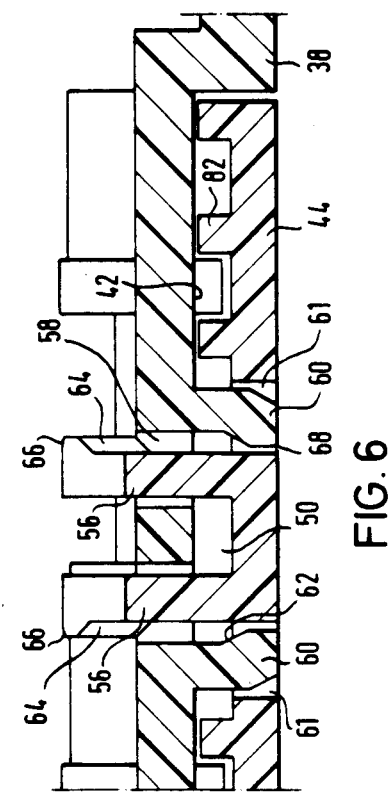
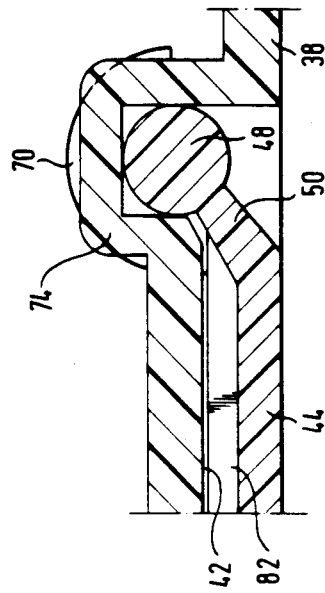
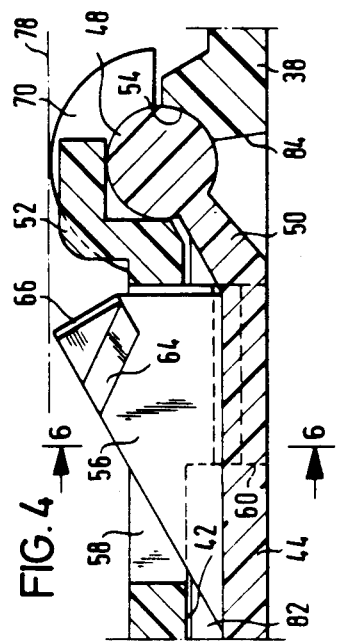
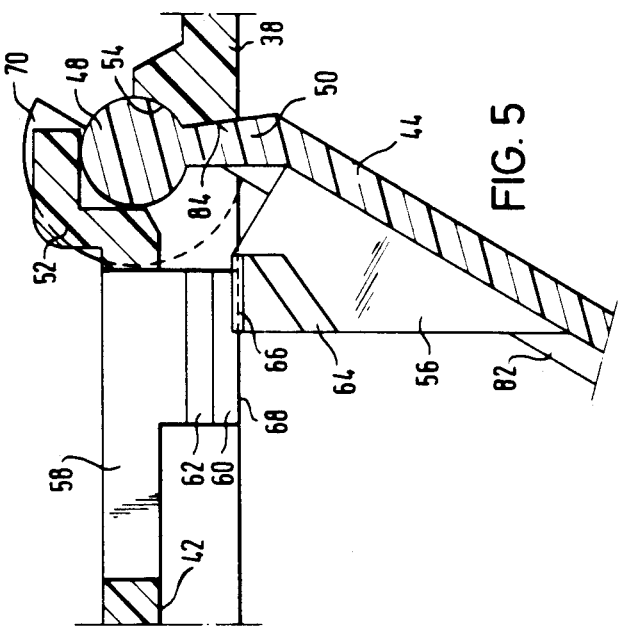

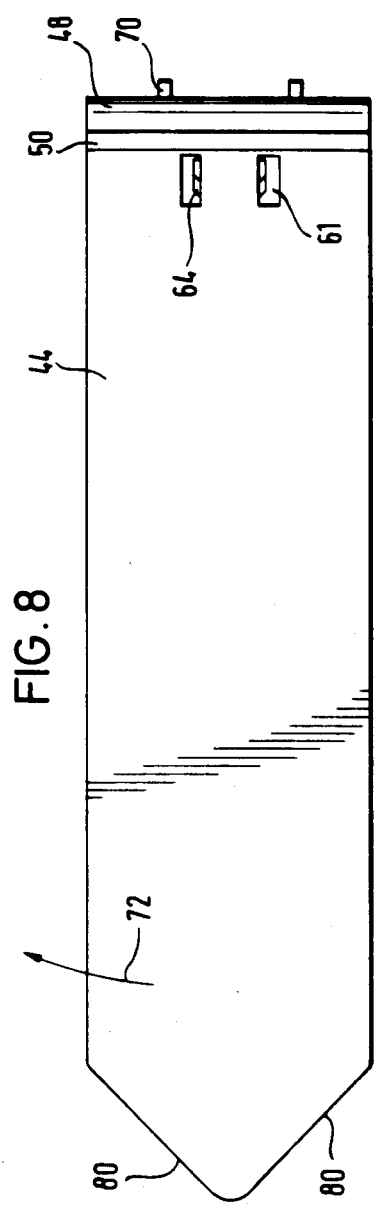
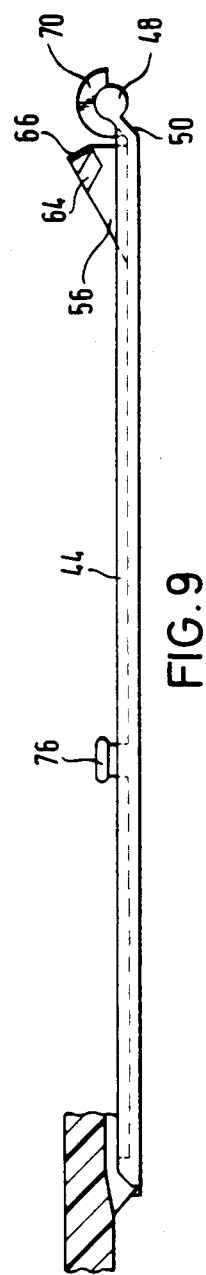
FIG. 8
FIG. 9

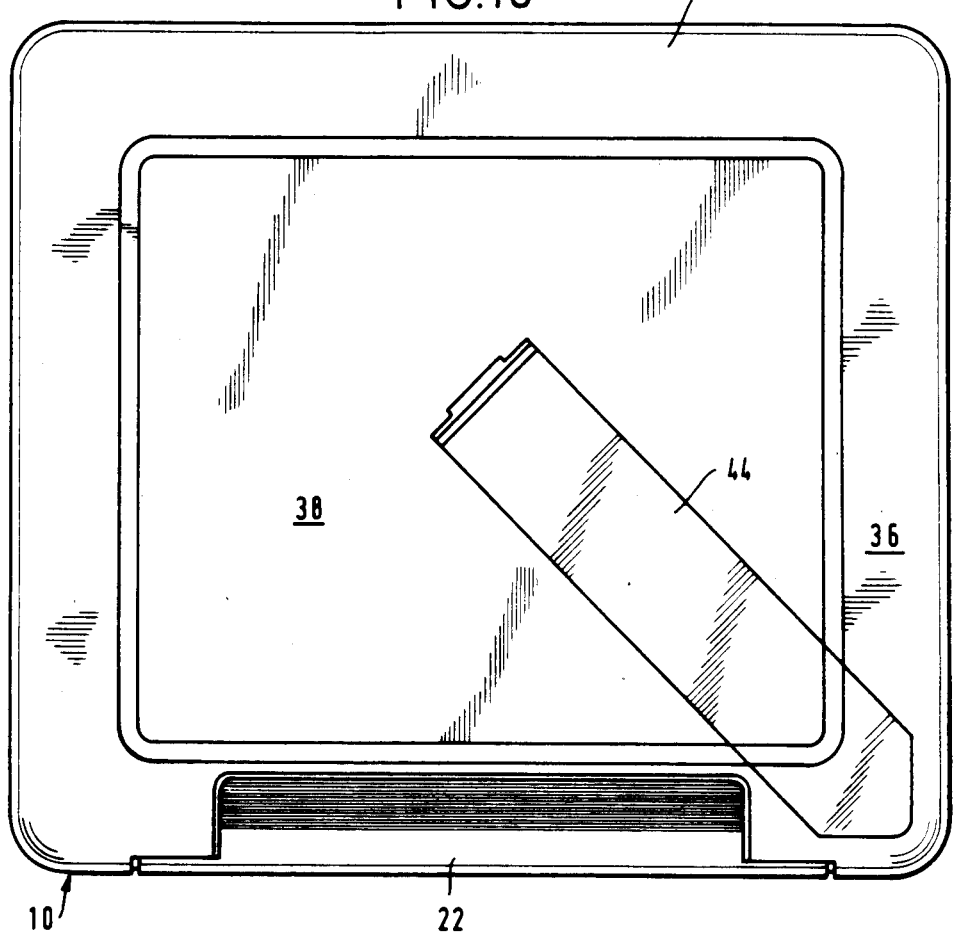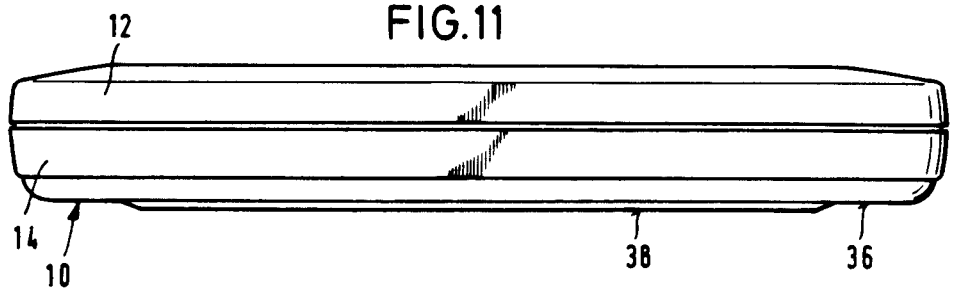

CONTAINER FOR A PILE OF PICTURES

The invention relates to a container for a pile of pictures, that is to say a pile of substantially rectangular pictures of like format, especially photographic prints. It comprises a housing provided with a viewing window and a slider member that can be pulled out of the housing parallel to the plane of the viewing window. Hinged to the housing, opposite the viewing window, is a stand which can be folded out or folded away to allow the container to be used alternatively also as a standing frame.

A container of this type is known from U.S. Pat. No. 4,376,348. In the known container there is provision for the pile to be rearranged cyclically by pulling the slider member out of the housing and pushing it back into the housing again, for which purpose a change mechanism is accommodated in the container. The stand for the known container is approximately L-shaped and snaps into the housing base by means of two hinges provided at the ends of the legs of the L. The means for arresting this stand in the folded-out position is also provided in the region of the hinges.

It may happen that for structural reasons associated with the change mechanism the corners of the housing base are not available for the hinges. The hinge or hinges for the stand then have to be located further towards the middle of the housing base, with the result that the stand becomes shorter. In order to ensure the same stability for the frame, a shorter stand has, in turn, to be folded out from the folded-away position at a greater angle and retained in the folded-out position. On the other hand, the container is also intended to be suitable as a hanging frame, which requires the side of the container opposite the window to be substantially flat when the stand is folded away. The retaining means have accordingly to be accommodated in a recessed manner in the inside of the container where, however, it is also essential that a certain maximum level is not exceeded in order that the rearrangement function is not impeded.

The object of the present invention is to provide a container that takes into account the circumstances explained above.

According to the invention there is provided a container for a pile of substantially rectangular pictures of like format, having a housing with a viewing window and a slider member that can be pulled out of the housing and a stand hinged to the housing base, opposite the window, which stand has stop members which arrest the stand when the stand is folded out by coming up against complementary stop members on the housing, the stop members and the complementary stop members being arranged at a distance from the hinge of the stand in the direction of the free end of the stand and the elements having the stop faces being designed and arranged in such a manner that they move apart with resilient deformation as the stand is folded out and overlap one another when the stand is folded away.

The structure according to the invention allows the retaining means for the stand to be of minimum thickness (in the direction of the depth of the container), it being possible for the stand to be folded out through the requisite angle without the stop members being arranged too close to the hinge pivot of the stand, that is to say the stand can engage securely without the moment stress becoming too great.

Because the lever arm is shorter, greater forces than in the known structure act not only on the arresting means but also on the hinge itself. For that reason in a preferred embodiment special elements are provided which make it difficult for a stand that has been snapped in to be torn out of the hinge by torsional stress.

Further developments of the invention can be seen from the following description and the claims.

The invention is explained in detail below with reference to the embodiment shown in the enclosed drawings.

FIGS. 4 and 5 show a partial section through the base region of the container from FIG. 1 with the stand folded away and folded out, respectively.

FIG. 6 shows a partial section in the base region of the container along the line 6—6 in FIG. 4.

FIG. 7 shows a section along the line 7—7 in FIG. 2.

FIGS. 8 and 9 show the stand for the container from FIG. 1 in plan view and in side view.

Figure 1:
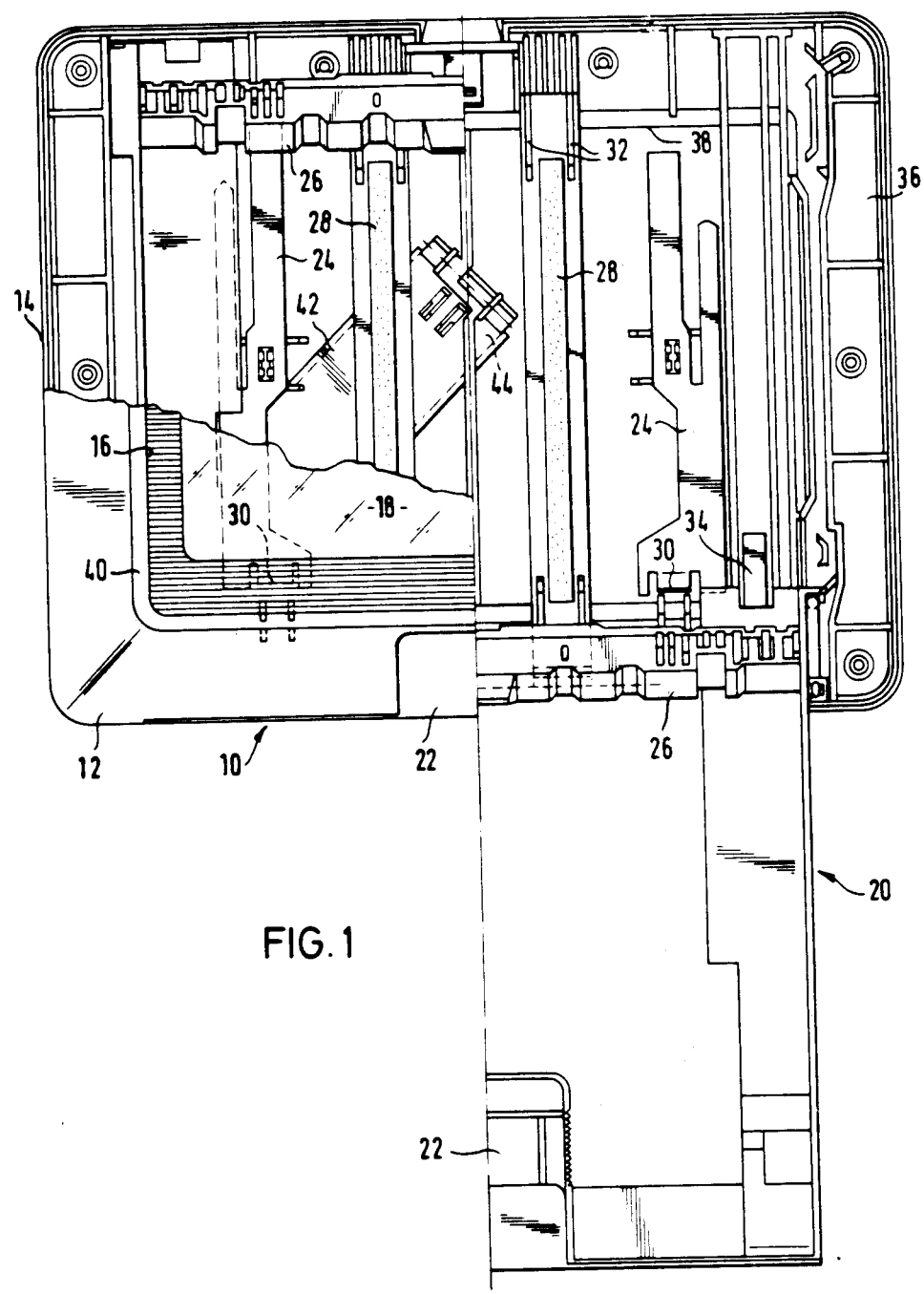
FIG. 1 is a plan view, in part cut away and in part with the slider member withdrawn, of a container designed as a picture changer.
Figures 2, 3:
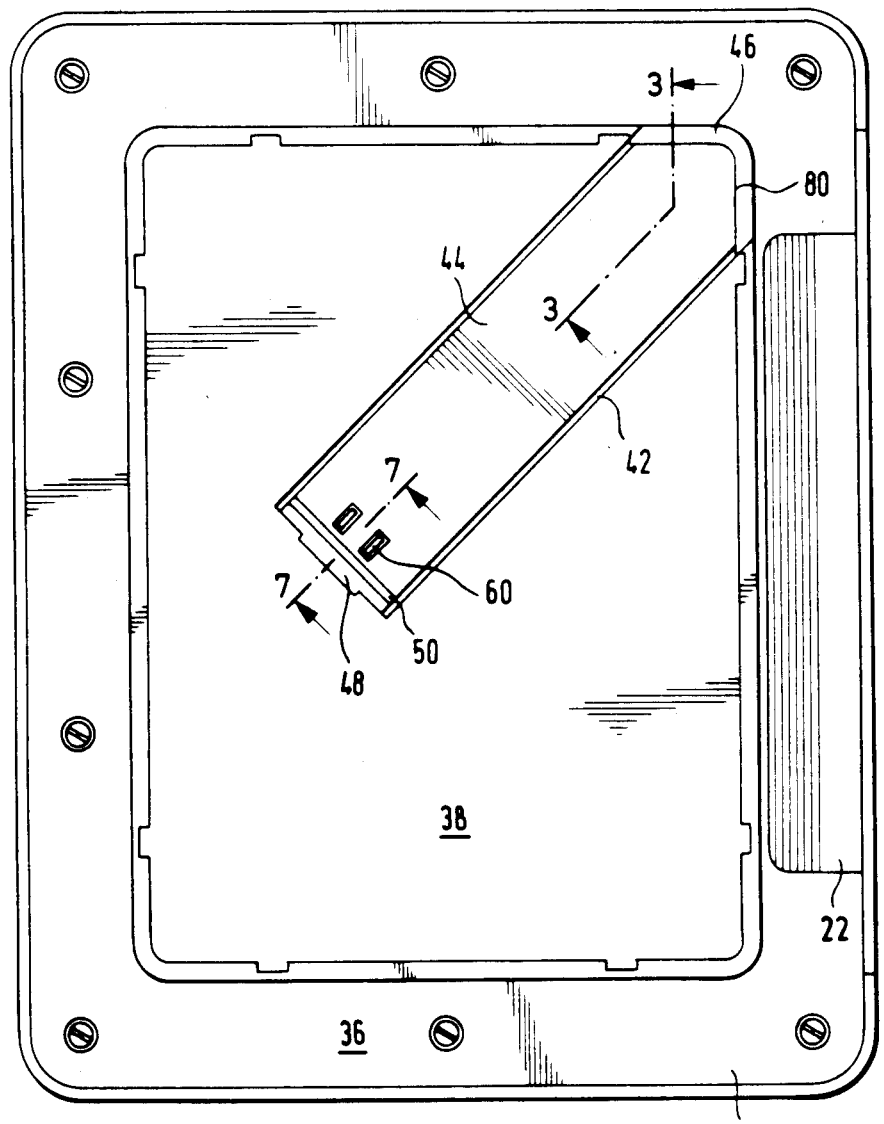
FIG. 2 shows the underside of the container from FIG. 1.
FIG. 3 is a section along the line 3—3 in FIG. 2.

FIGS. 10 and 11 show a modified embodiment in a rear view and a side view, respectively. The container shown, which is designed as a picture changer, has a housing 10 comprising an upper shell 12 and a lower shell 14 which, as shown, are connected to one another by screws or by welding, snap-fit means or the like. The upper shell 12 has a substantially rectangular or square cut-out 16 for a window 18 which is surrounded, passepartout-like, by the upper shell 12.

The housing 10 accommodates a slider member 20 which is provided with a grip part 22 and is guided displaceably in the housing 10, for which purpose the slider member 20 can be grasped by the grip part 22 which is accommodated in corresponding recesses in the upper and lower shells 12, 14 when the slider member 20 has been pushed in. The slider member 20 accommodates a pile of pictures which, when the slider member is pushed in, is pressed by means of springs 24 in the direction towards the window 18.

Also provided is a separating device which serves to separate an individual picture from the pile of pictures. The separating device comprises a separator 26 which is secured to the slider member 20 on the side opposite the grip part 22.

A retaining means is provided which retains the picture separated from the pile of pictures by the separating device in the housing 10 when the slider member 20 is pulled out of the housing 10, while the remainder of the pile is pulled out of the housing 10 with the slider member 20. The retaining means comprises a retentive coating 28 on the inside of the housing 10 facing the window 18.

A feed device serves to feed pictures to the separating device. It comprises hook-like members 30 on the sides of the springs 24 facing the grip part 22. The hook-like members 30 serve to press the pictures in the pile against the separator 26 in staggered manner during the change operation and to hold the last picture in the pile in a gap between the separator 26 and the retentive coating 28, the separator 26, during the beginning of the change operation, at first running over rails 32, against which the last picture is pressed so that the separator 26 can pass over this last picture.

The last picture in the pile, which remains in the housing 10 during the change operation, is lifted progressively by a guide device comprising the springs 24 and further lifting springs 34 in the direction of the window 18 as the slider member 20 is being pulled out, with the result that as the slider member 20 is pushed in again it passes to the other end of the pile of pictures.

The details of the change mechanism and of the change operation are not described as they are not relevant to the present invention and corresponding material can be found in any case in the patent specifications listed at the beginning.

The lower shell 14 forms a section 36 of the base of the housing 10 which is provided with a flat projection 38 which is designed to correspond to a bevel 40 arranged adjacent to the cut-out 16 and peripheral thereto, which allows the containers to be stacked. The flat projection 38 has a recess 42, which extends approximately diagonally with respect to the base section 36, for accommodating a fold-out stand 44 which, when folded away, is flush with the outer surface of the projection 38. In the edge region of the projection 38 is a recess 46 which can be engaged with a fingernail for the purpose of folding out the stand 44.

At one end the stand 44 has a pivot 48, a section 50 arranged at an oblique angle to the inside of the housing 10 being located between the stand 44 and the pivot 48. The pivot 48 is held by a snap-fit between an angled portion 52, which is moulded onto the recess 42, and a socket portion 54 on the base section 36.

Provided for the stand 44 is an arresting device which comprises two fork-like arresting ribs 56 arranged adjacent one another and moulded onto the stand 44, each of which ribs projects through an opening 58 in the recess 42 and into the inside of the housing 10 when the stand 44 is folded away. The free ends of the approximately triangular arresting ribs 56 splay outwards slightly at their sides remote from one another. Adjacent to the arresting ribs 56, ribs 60 extend from the bottom to the top of the recess 42; their free ends are flush with the surface of the projection 38, when the stand 44 is folded away they are located in corresponding apertures 61 in the stand 44, and they are provided in the region of their free ends with a slope 62 facing the adjacent arresting rib 56. As the stand 44 is folded out, the two arresting ribs 56 are pressed towards each other while the slopes 62 are passing and return to their normal position when they have overcome the resistance produced by the ribs 60. In order to overcome this resistance more easily, the arresting ribs 56 are provided laterally on the outside with bevels 64 which cooperate with the slopes 62 in the pressing together of the arresting ribs 56. In addition, bevels 66 are provided on their free outer edges which bevels interlock with the adjacent facing edges 68 at the free ends of the ribs 60 after the stand has been folded out and facilitate the folding away of the stand 44. The bevels 64 and 66 are arranged in such a manner that when the stand 44 is folded out and they meet the slopes 62 or are in engagement with the edges 68 they are virtually parallel therewith.

Two projections 70 shaped like the segments of a circle serve to ensure that the stand 44 does not come out of its hinge 52, 54 if there is a lateral jolt in the direction of the arrow 72.

Part of the pivot 48 is also arranged under a cover portion 74 which on the one hand imparts additional stability to the part of the hinge in the lower shell 14 and on the other hand allows the parts arranged inside the housing 10 to be passed over unhindered.

A plug 76 serves to hold the stand 44 in the folded-away position. In this position the parts of the arresting device are below a line 78 with the result that the functioning level of the change mechanism located in the housing 10 is not interfered with. The stand 44 has at its free end two bevels 80, arranged at right angles to each other, of which one extends parallel to one side of the container and the other extends parallel to an adjacent side that is perpendicular thereto, with the result that the container can be stood upright or, alternatively, on its side. In addition, reinforcing ribs 82 can be provided on the side of the stand 44 facing the housing 10.

When the stand 44 is folded out, its angled portion 50 rests against stop faces 84 which define the recess 42 on one side, are adjacent the socket portions 54 and are present in the region of the socket portions 54 but not of the cover portion 74, with the result that the stand cannot be folded any further outwards.

FIGS. 10 and 11 show modification in which the stand 44 which is contoured in the transition region at the edge of the projection 38 in such a manner that the contour of this transition region is continued, and continues a bit further into the base section 36. The stand is extended axially, with the result that the container stands relatively erect when the stand 44 is folded out, both in the upright position and when sideways on.

What is claimed:

1. Container for a pile of substantially rectangular pictures of like format, having a housing with a viewing window and a slider member that can be pulled out of the housing, and a stand attached by a hinge to the housing base opposite the window, which stand has stop members which arrest the stand when it is folded out by coming up against complementary stop members on the housing, the stop members and the complementary stop members being arranged at a distance from the hinge of the stand in the direction towards the free end of the stand and the elements having the stop faces being designed and arranged in such a manner that as the stand is folded out they move apart with resilient deformation and when the stand is folded away they overlap one another.

2. Container according to claim 1 in which the elements of the stand that carry the stop faces of the stand project into the housing.

3. Container according to claim 1 or 2 in which the elements of the housing that carry the complementary stop faces project out of the base of the housing to such an extent that their outer ends are substantially flush with the outer surface of the stand.

4. Container according to claim 3 in which the elements on the housing side project through apertures in the stand.

5. Container according to claim 1 in which the stop members on the stand deform resiliently.

6. Container according to claim 1 in which a pair of stop members and a pair of complementary stop members are provided which deform resiliently in opposite directions to one another.

7. Container according to claim 1 in which the stop members are in the form of ribs (56, 60).

8. Container according to claim 7 in which the complementary stop ribs (60) have run-up slopes (62) for the stop ribs (56) on the stand (44).

9. Container according to claim 1 wherein at least one of said stop members and complementary stop members are provided with camming-action surfaces for deflecting the resiliently deformable element.

10. Container according to claim 1 in which the stand (44) has a pivot moulded onto it which snaps into a hinge member, comprising an angled portion (52) and a socket portion (54), which is provided on the housing base.

11. Container according to claim 10 in which projections (70) constructed in one piece with the pivot of the stand are supported laterally in the inside of the housing.

12. Container according to claim 10 in which the pivot (48) is covered in the inside of the housing at least partially by a projection (74) of the housing.

13. Container according to claim 1 in which the outer surface of the stand is substantially flush with the surrounding outer surfaces of the housing base when the stand is in the foldedaway position.

14. Container according to claim 13 in which the housing base has an outwardly projecting surface region that is substantially congruent with the viewing window and in which the free end of the stand (44) lies within the contour of this surface region.

15. Container according to claim 1 in which the stand (44) extends from a position approximately in the plane of symmetry parallel to the withdrawal direction approximately diagonally in the direction of the substantially rectangular outer contour of the housing.

16. Container according to claim 14 in which the housing base has a recessed portion near the free end of the stand to allow the stand to be gripped.

17. Container according to claim 15 in which the hinge of the stand is arranged between two elements of the slider member arranged symmetrically in the housing with respect to the plane of symmetry.

18. Container according to claim 13 in which the housing base has an outwardly projecting surface region (38) that is substantially congruent with the viewing window and in which the stand (44) is contoured in such a manner in the edge region thereof that its contour is continued.

* * * * *